Oct. 1, 1963          O. R. IDING          3,105,577

ELECTRICAL CIRCUIT FOR A MEMORY SEAT CONTROL SYSTEM

Original Filed June 4, 1958          6 Sheets-Sheet 1

*INVENTOR.*
ORVILLE R. IDING
BY
ATTORNEYS

INVENTOR.
ORVILLE R. IDING

Oct. 1, 1963 — O. R. IDING — 3,105,577
ELECTRICAL CIRCUIT FOR A MEMORY SEAT CONTROL SYSTEM
Original Filed June 4, 1958 — 6 Sheets-Sheet 4

INVENTOR.
ORVILLE R. IDING
BY Whittemore,
Hulbert & Belknap
ATTORNEYS

FIG. 11.

Oct. 1, 1963     O. R. IDING     3,105,577
ELECTRICAL CIRCUIT FOR A MEMORY SEAT CONTROL SYSTEM
Original Filed June 4, 1958     6 Sheets-Sheet 6

FIG.12.

*INVENTOR.*
ORVILLE R. IDING
BY
ATTORNEYS

United States Patent Office 3,105,577
Patented Oct. 1, 1963

1

3,105,577
ELECTRICAL CIRCUIT FOR A MEMORY SEAT
CONTROL SYSTEM
Orville R. Iding, Detroit, Mich., assignor to Ferro Stamping Company, Detroit, Mich., a corporation of Michigan
Continuation of application Ser. No. 739,721, June 4, 1958. This application Nov. 20, 1961, Ser. No. 155,528
10 Claims. (Cl. 192—.02)

The present invention relates to an electrical circuit for a memory seat control system.

This application is a continuation application of applicant's copending application Serial No. 739,721, now abandoned. Applicant is the inventor of the electrical portion of the disclosure.

It is an object of the present invention to provide an electrical circuit for a seat control system capable of effecting movement of a seat from any intermediate position to a fully lowered and retracted position by operation of a single retracting switch, and return movement of the seat from its fully retracted and lowered position to a preselected intermediate position by the actuation of a single restoring switch.

It is a further object of the present invention to provide a memory control system including a circuit having a first set of switches closed except when the seat is in a first intermediate position, a second set of switches which are closed except when the seat is in a second intermediate position, a set of limit switches are closed except when the seat is in a fully retracted position, adjusting mechanism including an electric motor for the seat, and an electric circuit having a first operative portion including a first manual switch and said first set of switches operable when said manual switch is closed to effect movement of said seat to said first intermediate position, said circuit including a second operative portion including said second manual switch and said second set of switches operable when said second manual switch is closed to effect movement of said seat to said second intermediate position, said circuit including a third operative portion including a third manual switch and said limit switches operable when said third manual switch is closed to effect movement of said seat to said fully retracted position.

It is a further object of the present invention to provide a system including a circuit as set forth in the preceding paragraph including sequence relays in said circuit effective to cause adjustment of said seat to take place with horizontal movement thereof, vertical movement of the front edge thereof, and vertical movement of the rear edge thereof in a predetermined sequence.

It is a further object of the present invention to provide a control circuit for a memory system for an adjustable vehicle seat, the seat having mechanism for effecting vertical movement of its forward edge, vertical movement of its rear edge, and fore and aft movement of the seat as a whole, a single electric motor, drive means including solenoid actuated clutches selectively coupling said motor to said adjusting mechanism, said circuit including a first set of switches closed except when said seat is in a first intermediate position, a second set of switches closed except when said seat is in a second intermediate position, a set of limit switches closed except when said seat is in fully retracted position, an electric circuit connecting said sets of switches, said motor, and said solenoids, said circuit including a first portion comprising a first manual switch and said first set of switches effective to energize said motor and solenoids to effect movement of the seat to said first intermediate position, said first set of switches being moved to open position to terminate seat movement, said circuit including a second portion including a second manual switch and said second set of switches and operable when said second manual switch is closed to complete a circuit to said motor and said solenoids effective to move said seat to said second intermediate position, said second set of switches opening when said seat arrives at said second intermediate position, said circuit including a third portion comprising a third manual switch and said limit switches and operable when said third manual switch is closed to energize said motor and said solenoids to effect movement of said seat to fully retracted position, said limit switches being moved to open position upon arrival of said seat at retracted position.

Other objects and features of the invention will become apparent as the description proceeds, especially when taken in conjunction with the accompanying drawings, illustrating preferred embodiments of the invention, wherein:

FIGURE 2-A is a top view partly broken away of the clutch and gear box shown in FIGURE 2.

FIGURE 2-B is a fragmentary section view of the clutch and gear box shown in FIGURE 2-A taken on line 2B—2B in FIGURE 2-C.

FIGURE 2-C is an end view of the clutch and gear box of FIGURE 2-A with the end cover removed.

Referring now to the drawings, the memory control system for seat adjustment is illustrated as applied to a seat in which adjustment is effected by providing a lower slide movable fore and aft of the vehicle on fixed rails, and seat support frame elements are pivoted by levers at the front and rear ends to the slide. Obviously, fore and aft movement of the slide effects fore and aft adjustment of a seat mounted on the seat frame elements. The levers which interconnect the front and rear ends of the slide and seat frame elements are preferably bell type crank levers so connected as to cause rocking movement of the levers to produce generally up and down movement of the corresponding ends of the seat frame elements. With this arrangement it is of course apparent that by suitably actuating the levers at both the front and rear of the seat frame elements, the seat may be raised or lowered. If only one of such levers is actuated the seat is tilted either forwardly or rearwardly.

Figures 1, 2:
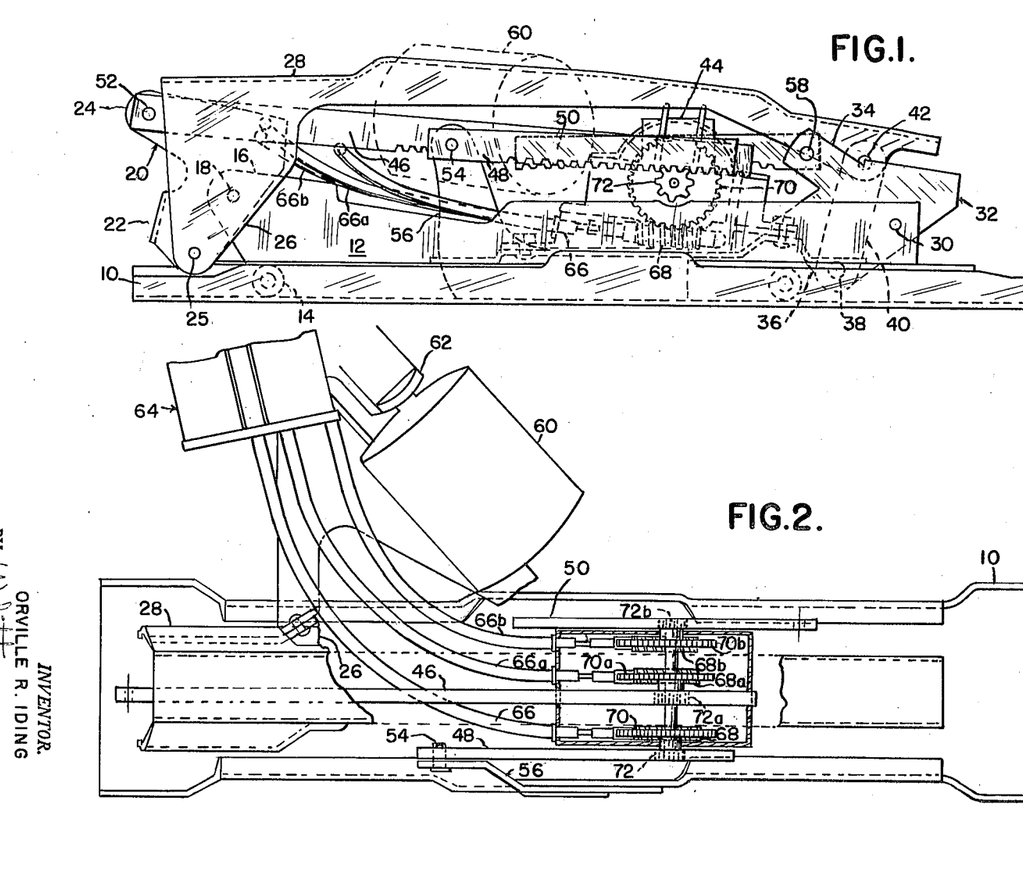
FIGURE 1 is a partial elevational view of the seat supporting and adjusting mechanism.
FIGURE 2 is a fragmentary partly broken away top view showing the connection from a motor through a clutch and gear box to worm and worm gears actuating rack driving pinions.
Figures 2A, 2B, 2C:
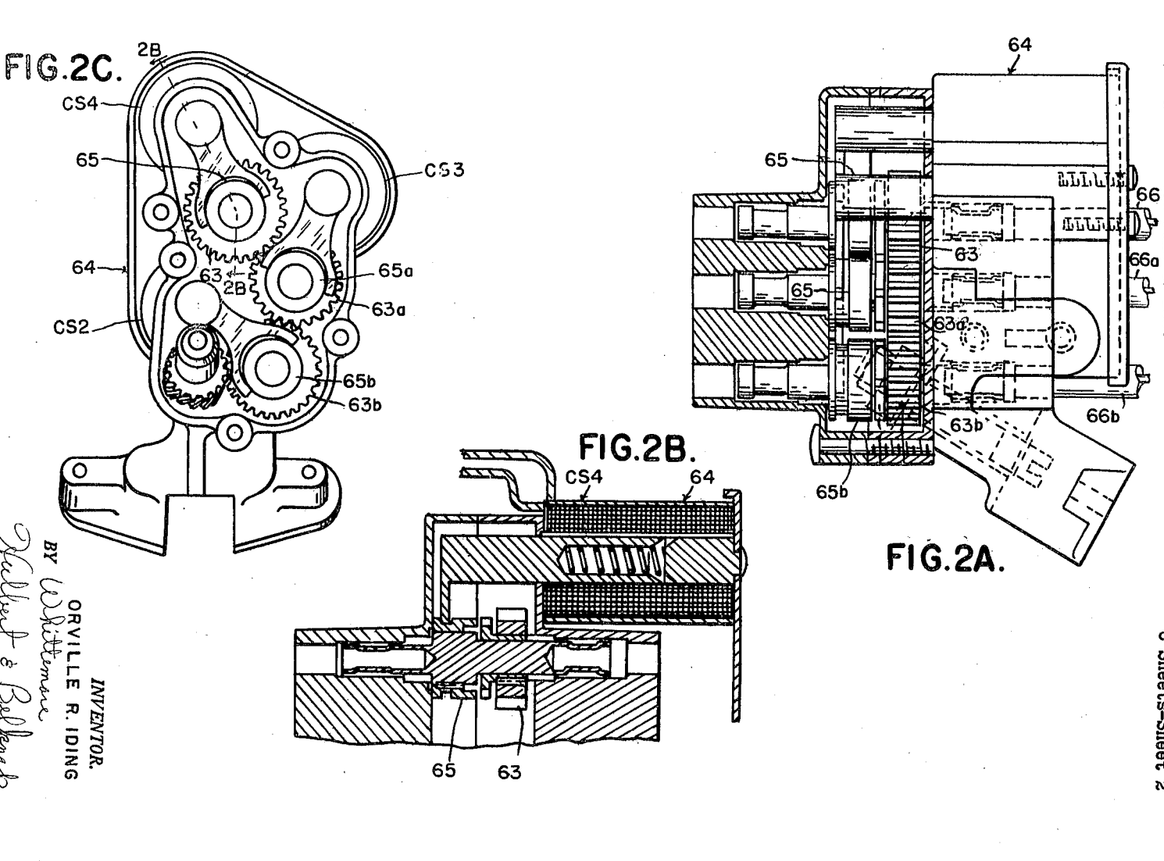

The foregoing seat adjusting mechanism is best illustrated in FIGURE 1 where one of the stationary rails or tracks is indicated at 10 adapted to be bolted or otherwise secured to the floor of the vehicle. It will of course be understood that a pair of such rails are provided located adjacent opposite ends of the seat and similarly, a pair of slides and seat frame elements are also provided.

Mounted for fore and aft adjustment on the stationary rail or track 10 is a slide 12, suitable rollers for providing for relatively free adjustment of the slide 12 being shown at 14. Adjacent the forward end of the slide 12 is an upstanding ear 16 affording a pivot mounting as indicated at 18 for a bell crank lever 20 having a lifting arm 22 and an actuating arm 24. Pivotally connected, as indicated at 25, to the lifting arm 22 of the bell crank lever 20 is a depending arm 26 of the seat frame element 28.

Similarly, a pivot mounting 30 is provided adjacent the rear end of the slide 12 to which is secured a bell crank lever 32 having an actuating arm 34 and a lift arm 36. The lift arm 36 has pivotally connected thereto, as indicated at 38, a lifting link 40 the upper end of which is pivotally connected, as indicated at 42, to the rear end of the seat frame element 28.

In order to effect power actuation of the seat to various adjusted positions, there is provided for movement with the slide 12 a drive unit 44 having therein three pinions 72, 72a and 72b, FIGURE 2 each of which is in mesh with an actuating rack. The three actuating racks are shown at 46, 48 and 50. The rack 46 at its forward end is pivotally connected as indicated at 52 to the actuating arm 24 of the front lift bell crank lever 20. The rack 48 is pivotally connected as indicated at 54 to a stationary post 56 which may be connected to the stationary rail or track member 10, or may be connected directly to the floor of the vehicle. The rack 50 is pivotally connected as indicated at 58 to the actuating arm 34 of the rear lift bell crank lever 32.

Each of the three pinions in mesh with the racks 46, 48 and 50 is separately actuated and in accordance with the present invention a single electric motor may be provided selectively coupled to one or more of the pinions by flexible drive shafts which are selectively clutched to the transmission means. One such single motor multiple drive unit is fully set forth in Patent No. 2,886,094 and will therefore be considered only briefly herein. Reference is made to the cited patent for a detailed consideration of the particular single motor multiple drive unit illustrated.

Referring now to FIGURES 2, 2–A, 2–B and 2–C there is shown a motor 60 having an output 62 connected to a gear and clutch box indicated generally at 64. Within the box 64 are a plurality of intermeshing gears 63, 63a and 63b driven from the motor 60 each of which is connected through a solenoid actuated clutch 65, 65a and 65b to a flexible drive cable 66, 66a and 66b leading to a worm 68, 68a and 68b in mesh with a worm gear 70, 70a and 70b keyed or otherwise secured to a pinion 72 which is in mesh with one of the racks 46, 48 or 50, as shown in FIGURE 2. It will be apparent that by operation of suitable electrical circuitry, the motor 60 may be energized and the appropriate one or more of the solenoids within the box 64 energized to connect the motor to the corresponding flexible drive cable which in turn effects actuation of a corresponding one of the racks.

Figure 3:
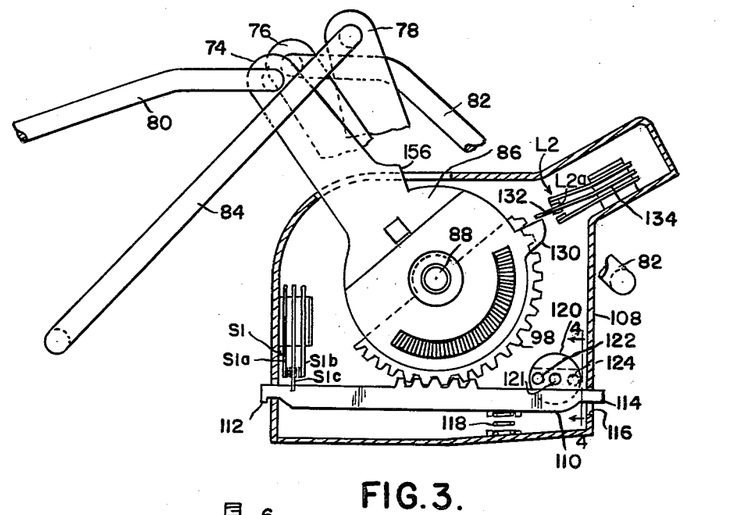
FIGURE 3 is a fragmentary elevational view showing a memory control device and its mechanical connections to the adjustable seat structure.
Figure 4:
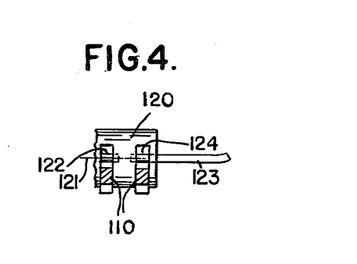
FIGURE 4 is a fragmentary vertical section on the line 4—4, FIGURE 3.
Figure 5:
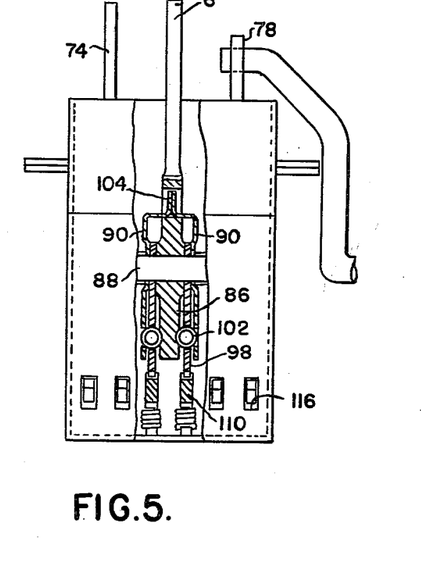
FIGURE 5 is a fragmentary plan view partly in section of the memory control device.

Referring now to FIGURES 3–10 there is shown the memory control device which is adapted to be carried by and hence movable with the seat or a seat frame element 28. The memory device includes three setting levers 74, 76 and 78. The lever 74 is connected by a link 80 to the actuating arm 24 of the front lift bell crank lever 20. The lever 76 is connected by a link 82 to the actuating arm 34 of the rear lifting bell crank lever 32. The third lever 78 is connected by a link 84 to the stationary post 56 carried by the stationary rail or track 10 or a similar post fixedly mounted on the floor of the vehicle. The links 80, 82 and 84 are connected to the bell crank lever 20, actuating arm 34 and post 56 in the same manner as they are connected to levers 74, 76 and 78, as shown in FIGURES 3 and 5.

From the foregoing it will be seen that for each of the infinite number of intermediate positions which may be occupied by the adjustable vehicle seat, there will be corresponding positions of the setting levers 74, 76 and 78.

Figure 8:
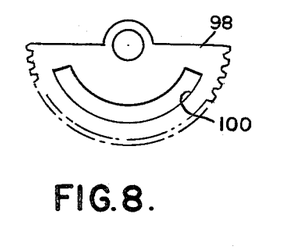
FIGURE 8 is an elevational view of a toothed sector employed in the assembly of FIGURE 6.
Figure 9:
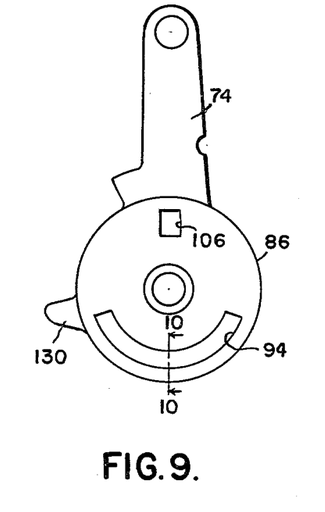
FIGURE 9 is an elevational view of a position responsive setting lever employed in the assembly of FIGURE 6.
Figure 10:
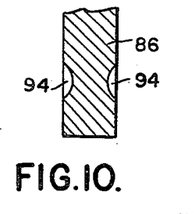
FIGURE 10 is a fragmentary section on the line 10—10, FIGURE 9.

Referring more particularly to FIGURES 6–10, each of the levers 74, 76 and 78 extend from generally cylindrical discs 86 provided with central openings by means of which they are mounted for rotation on a tubular support or bearing member 88. Rigidly affixed to opposite sides of the discs 86 are plates 90 provided with elongated arcuate slots 92. As best seen in FIGURE 9, each of the discs 86 is provided with similar arcuate recesses 94 which are of arcuate cross-section as best seen in FIGURE 10.

Figure 6:
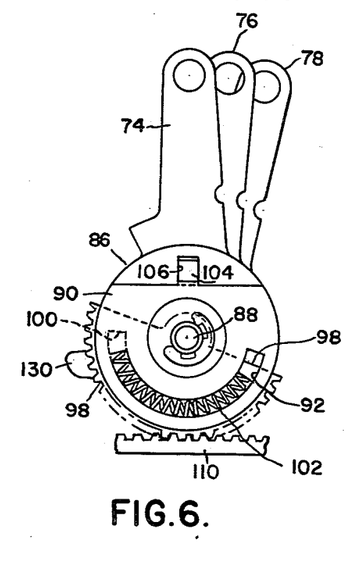
FIGURE 6 is a fragmentary perspective view of a part of the position setting device.
Figure 7:
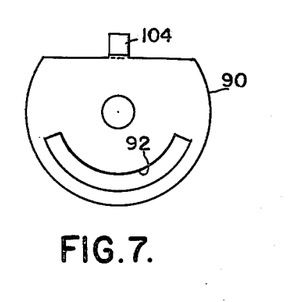
FIGURE 7 is an elevational view of a spring retainer plate used in the assembly shown in FIGURE 6.

Mounted for rotation with respect to discs 86 on bearing member 88 on opposite sides of each of the discs 86 and between the discs and the adjacent plates 90 are a pair of toothed sectors 98. Each of the toothed sectors, as best illustrated in FIGURE 8, is provided with an elongated arcuate slot 100. Received in the slot 100 in the toothed sectors 98 are coil compression springs 102. The compression springs extend partly into the arcuate slots 92 in the plates 90 and are partly received in the arcuate recesses 94 at the opposite sides of the discs 86. With the parts in the position illustrated in FIGURE 6 the ends of the arcuate slots 100 are not in alignment with the ends of the slots 92 and arcuate recesses 94 which are in alignment. It will be apparent that in this condition the spring 102 is under appreciable compression and the sectors are spring biased to return to a position in which the ends of the arcuate slots 100 therein are in alignment with the ends of the recesses 94 and slots 92. However, relative angular movement between the discs 86 and the associated arm 74, 76 or 78 which are fixed in relation to either or both of the toothed sectors associated therewith is permitted. It may be mentioned at this time that the plates 90 which are located at opposite sides of each of the discs 86 are connected thereto by a finger 104 which is received in a recessed seat 106, the seats being located at opposite sides of each of the discs 86 and each pair of seats together forming an aperture through the individual discs 86 as shown in FIGURES 6 and 9.

The memory device comprises a housing 108 in which are located six switch actuating rack bars 110, one being associated with each of the toothed sectors. The rack bars have ears 112 at one end which form a loose pivot support and permits limited longitudinal movement thereof. The opposite end of each of the rack bars, as indicated at 114, is vertically movable in a slot 116 in the housing 108. Suitable spring means such for example as indicated at 118 biases the several rack bars upwardly. Mechanically operable means indicated at 120 are provided for depressing one rack bar associated with each of the three discs and lever devices. As indicated, the actuator comprises a slotted cylinder mounted for rotation about its axis 121 and having abutments 122 engageable with one of the rack bars associated with three of the levers, and abutments 124 associated with the remaining rack bars and levers. A section of the cylinder 120 is shown in FIGURE 4. It will be understood that three such sections in axial alignment are provided in connection with the three sets of rack bars associated with the three levers 74, 76 and 78. The three sections of cylinder 120 are rotatable about the common axis 121 by any convenient means such as a drive cable 123 attached at one end to the end section of cylinder 120 and at the other end to suitable drive means (not shown).

In the position illustrated in FIGURE 3 each of the rack bars 110 is permitted limited longitudinal movement.

Provided in the housing 108 in association with each of the rack bars 110 are switches S1, S2, S3, S4, S5 and S6. In FIGURE 3 it is assumed that the switch is S1 and it comprises contacts S1a and S1b, together with an intermediate movable contact S1c carried by a spring arm connected to the rack bar 110. With the rack bar in the position illustrated in FIGURE 3 it will be noted that the intermediate contact S1c of the switch S1 is spaced from the two contacts S1a and S1b. However, limited movement of the rack in either direction will close the center contact with either of the contacts S1a or S1b, at which time the sector, lever and spring may be as seen in FIGURE 6.

If it is assumed that the rack bar 110 is associated with a sector 98 associated with the lever 74, it will be apparent that operation of the rack 46 driven by worm gear 68a which produces rocking movement of the lever 20 in either direction from the illustrated position will initially cause longitudinal movement of the rack bar 110 so as to close one of the switch contacts S1a, S1c, or S1b, S1c. Since the contact S1c is carried by a flexible arm, the contacts will remain closed while the rack bar 110 undergoes its relatively limited longitudinal movement. Thereafter, continued movement of the lever 20 will result in continued angular movement of the lever arm 74. At this time the rack bar 110 is prevented from moving and accordingly the spring 102 becomes compressed as the end of the recess 94 in the disc 86 and the end of the slot 92 in the plate 90 carry one end of the spring away from one end of the slot 100 in the toothed sector 98. So long as the seat remains out of adjustment the spring will remain compressed and the switch S1 will remain closed in one direction or the other. However, when the seat is brought back so that the lever 20 occupies the position which it initially occupied, the intermediate switch contact S1c resumes its neutral intermediate position as shown in FIGURE 3.

Means are provided for operating the setting levers 74, 76 and 78 to establish a memory control for two intermediate seat positions which may for convenience be designated "His" and "Hers."

It will be understood that the memory system disclosed herein is associated with a multiple position manually controlled seat adjusting mechanism of the usual type so that the operator or two operators of the vehicle adjust the front seat to the position which best suits them. During such adjustment the rack bars 110 will be in the upper position shown in FIGURE 3 and accordingly, movement of the seat to the adjusted position will effect movement of the rack bars 110 out of the neutral position and into a limiting position as determined by abutments thereon engageable with adjacent portions of the housing 108. The longitudinal movement permitted the rack bars is relatively slight. After the bars have moved to a limiting position, further movement of the seat will have the effect of compressing the spring 102 as a result of movement of one end thereof by the ends of the recess 94 and slot 92. After the seat has been brought into a preselected position, and assuming that the adjustment has been accomplished by the individual who is to use the so-called "His" control switch, then the mechanically operable means 120 is rotated in the appropriate direction to depress one of the rack bars associated with each of the setting levers 74, 76 or 78. When the rack bars are dropped to a position in which they release the toothed sectors 98, the sectors immediately return to an intermediate or center position with respect to the disc 86 of the associated setting lever. The manually operated mechanism 120 is then released and the racks move upwardly into meshed engagement with the toothed sectors. At this time the switches controlled by the three "His" rack bars are open. These switches will be open only when the seat is in the "His" position and will be closed in one direction or the other at any time when the seat is out of this adjusted position. It may also be noted that when the seat is in the "His" position all of the "Hers" switches will be closed in one direction or the other depending on the relative position in each of the three adjustments of the seat chosen for the "Hers" position.

Inasmuch as the present invention has as a primary object to facilitate movement of the seat to a fully lowered and retracted position followed by a restoring movement to a predetermined intermediate operating position, limit switches are provided in association with the memory control device operable to terminate seat movement when the seat has reached its fully lowered and fully retracted position. For this purpose a plurality of single pole, single throw, normally closed limit switches L2, L3, and L4 are provided.

Each of the discs 86 includes a radial projection 130 which is engageable with a projection 132 on the flexible arm 134 which carries a movable contact L2a, L3a, or L4a. The projections 130 are so located that as each of the setting levers 74, 76 and 78 reaches a position corresponding to the fully lowered and retracted position of the seat, its projection 130 shifts the movable contact of the associated limit switch out of engagement with its stationary contact.

Figure 11:
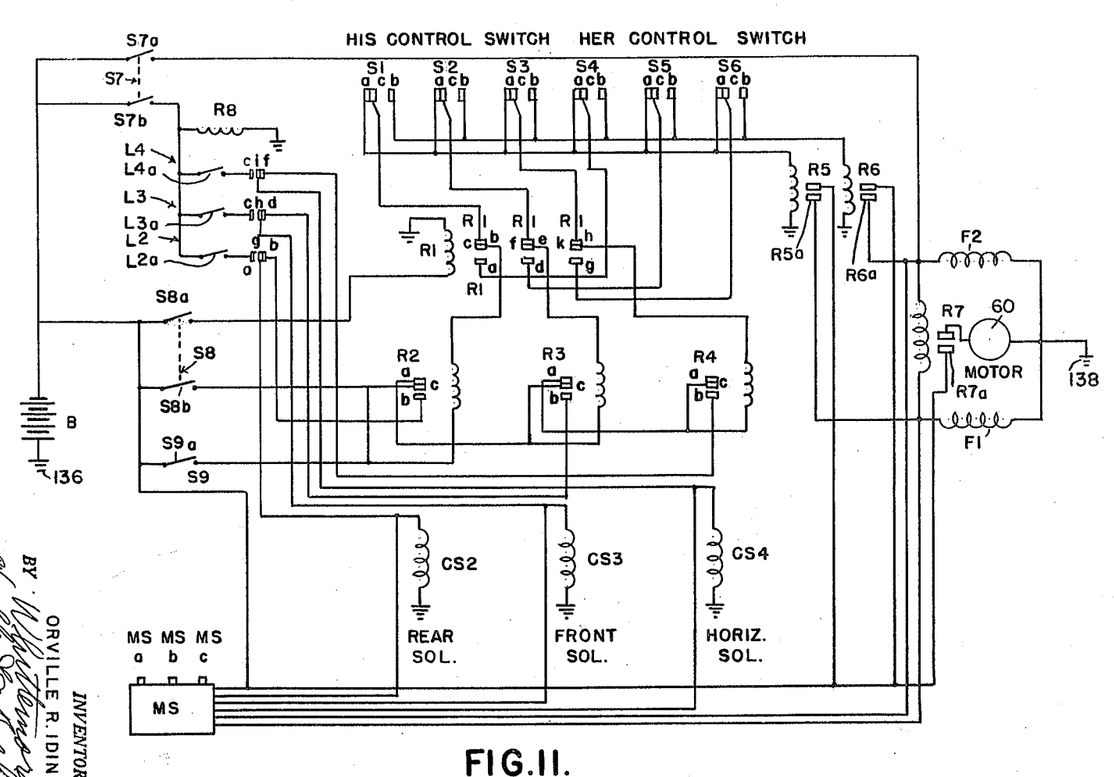
FIGURE 11 is a circuit diagram of a circuit suitable for employing the mechanism in effecting adjustment of the seat.

Referring now to FIGURE 11 there is shown the electrical circuit for effecting movement of the seat from any intermediate position to a fully lowered and retracted position, and for returning the seat to either of two preselected intermediate positions. The circuit in general is connected to the usual manual control circuit effected by a manual switch MS having three buttons MSa, MSb and MSc which are adapted when depressed to energize the motor 60 in either forward or reverse direction and to connect the appropriate one of the clutch actuating solenoids CS2, CS3 and CS4. The memory control device comprises a set of three control switches S1, S2 and S3 which are a part of "His" control circuit, and three additional switches S4, S5 and S6 which are a part of "Hers" control circuit. The switches S1 through S6 include the intermediate movable contacts S1c, S2c, S3c, S4c, S5c and S6c, normally spaced from the relatively fixed pairs of contacts S1a, S1b, and S2a, S2b, etc. These are the switches which are controlled by movement of the several rack bars 110. In addition, the circuit includes a double pole, single throw retracting switch S7 having contacts S7a and S7b; a "Hers" manual double pole, single throw switch S8 having contacts S8a and S8b; and a "His" single pole, single throw switch S9 having the movable contact S9a. Included in the circuit is a relay R1 adapted to be controlled by the contact S8a of the switch S8, this relay having a first pair of fixed contacts R1a and R1b between which is a movable contact R1c normally engaged with the contact R1b; a second pair of stationary contacts R1d and R1e between which is a movable contact R1f normally in engagement with the stationary contact R1e; and a third pair of stationary contacts R1g and R1h between which is a movable contact R1k normally in engagement with the stationary contact R1h.

Sequencing relays R2, R3 and R4 are provided for effecting a sequencing control of seat movements as will later appear. The coils of the relays R2, R3 and R4 are sequentially energized in a predetermined program. The coil of the relay R2 is in series with the contact S9a of the "His" switch S9, the circuit being completed through this coil to the center movable contact R1c. Relay R2 has a pair of stationary contacts R2a and R2b between which is located a movable contact R2c normally in engagement with stationary contact R2a. Movable contact R2c is connected to the contact S8b of the "Hers" switch S8 and also to the movable contact S9a of the "His" switch S9. Contact R2a is connected through the coil of the relay R3 to the center movable contact R1f of the relay R1. The relay R3 is provided with a pair of fixed contacts R3a and R3b between which is a movable contact R3c normally in engagement with the fixed contact R3a. The movable contact R3c is connected to the stationary contact R2a. The stationary contact R3a is connected through the coil of the relay R4 to the movable contact R1k. Relay R4 is provided with a pair of stationary contacts R4a and R4b between which is located a movable contact R4c normally in engagement with the stationary contact R4a. Stationary contact R4a is not connected.

The control circuit for the motor 60 includes field windings F1 and F2 to which circuits may be completed by energization of relays R5 and R6 respectively, these relays including contacts R5a and R6a respectively. In addition, the motor control circuit includes a relay R7 having a high resistance coil and including normally open contacts R7a adapted to complete a circuit to the armature of the motor. The arrangement is such that the relay R7 is energized when either of the field windings F1 or F2 is energized. The circuit through the coil of the relay R7 is completed through one or the other of the field windings F1 or F2, but the current therethrough is negligible due to the high resistance of the coil of the relay R7.

The circuit includes a relay R8 having pairs of stationary contacts R8a, R8b, and R8c, R8d, and R8e, R8f. Intermediate stationary contacts R8a and R8b is a movable contact R8g normally in engagement with stationary contact R8b. Intermediate stationary contacts R8c and R8d is a movable contact R8h normally in engagement with stationary contact R8d. Intermediate stationary contacts R8e and R8f is a movable contact R8k normally in engagement with stationary contact R8f. The coil of relay R8 is in series with the contact S7b of the retracting switch S7 and a circuit is completed through the coil to ground as indicated at 140 when the retracting switch S7 is closed.

The circuit includes normally closed single pole, single throw limit switches L2, L3 and L4 including the movable contacts L2a, L3a and L4a adapted to be moved to a circuit opening position by the associated radial projection 130 of the appropriate setting lever 74, 76 or 78. The limit switches L2, L3 and L4 are respectively in series between contact S7b of the retracting switch S7 and the contacts R8a, R8c and R8e respectively of the relay R8.

While the operation of the system is probably apparent from the foregoing, a typical operation will be traced. In this operation it is assumed that the seat is in its fully retracted and lowered position. Accordingly, at this time limit switches L2, L3 and L4 are open, and it is further assumed that the memory control device has been so set that all of the switches S1 through S6 are closed in one direction or another as indicated in the diagram. At this time the "His" switch S9 is closed. As illustrated in the wiring diagram, it will be necessary for the operator to hold this switch closed until the seat reaches its intermediate adjusted "His" position. It will be understood however, that if desired a relay and holding circuit may be associated with the "His" switch S9 in a conventional manner so that only momentary closure by the operator of the "His" switch S9 is required, the circuit being held in until completion of the seat adjustment, at which time all three of the switches S1, S2 and S3 are open.

Closure of "His" switch S9 completes a circuit from the battery B through the coil of the relay R2, through contacts R1b and R1c, and through contacts S1a and S1c through the coil of relay R5 to ground. This closes the contact R5a establishing a circuit from the battery through field windings F1 and the parallel circuit through the relay R7 is energized, thus closing contact R7a and establishing a circuit through the armature of the motor.

Energization of relay R2 shifts the movable contact R2c into engagement with stationary contact R2b. A circuit is thus completed from the battery B through contacts S9a, R2c, R2b, R8b, R8g, through the windings of the clutch control solenoid CS2 to ground. Thus, the motor is energized in the appropriate direction to bring about a lifting movement of the rear lever 32 when the rack connected thereto is actuated by the pinion connected through the flexible drive connection 66 to the motor 60. The clutch solenoids CS3 and CS4 at this time are not actuated since the sequencing relays R3 and R4 have not been energized.

After appropriate adjustment of the rear lift lever 32 the associated setting lever reaches the preset position at which time the switch S1 opens. This has the effect of breaking the circuit through the relay R2 and also of course of breaking the circuit to the relay R5. De-energization of relay R2 causes the movable contact R2c to engage fixed contact R2a and a circuit is then completed through the "His" switch S9, contacts R2c, R2a, through the windings of the relay R3, contacts R1e and R1f, and through the contacts S2c and S2e of the "His" control switch S2 re-establishing a circuit through the windings of the relay R5 and again energizing the motor 60 in the appropriate direction. At this time the circuit through the rear clutch control solenoid CS2 is broken by movement of the movable contact R2c. Energization of relay R3 shifts the movable contact R3c downwardly into engagement with the contact R3b and a circuit is established from the battery through the "His" switch S9 through contacts R2c, R2a, R3c, R3b, R8d, R8h, and through the winding of the front clutch control solenoid CS3 to ground. This results in actuation of the front lift lever 20 until switch S2 opens, at which time sequencing relay R3 is de-energized, relay R4 is energized, and appropriate adjustment of the seat in a fore and aft direction occurs, until finally the switch S3 opens, thus terminating the re-adjustment of the seat.

It may be mentioned that the "Hers" control switch S8 includes a contact S8a which energizes the "Hers" relay R1 which has the effect of shifting the movable contacts R1c, R1f and R1h thereof from the position shown into engagement with the stationary contacts R1a, R1d and R1g respectively. With this difference the operation of the "Hers" re-adjustment circuit is the same as "His."

From the foregoing it will be observed that the seat may be adjusted through the manual control switch MS into either of two desired positions at which time the setting levers will have biased the normally spring centered toothed sectors 98 so that when the three "His" or "Hers" rack bars are depressed, the sectors will be spring urged into a predetermined position. Release of the rack bar depressing means permits the rack bars to engage the toothed sectors in the adjusted position.

With the seat in either of the two present intermediate positions, or in fact any intermediate position, closure of the retracting switch S7 results in a sequenced movement of the seat to fully retracted and lowered position, this adjustment continuing until operation of the motor 60 is terminated by opening of the last of the three limit switches L2, L3 and L4. Upon re-entering the vehicle the operator may depress either the "His" or "Hers" switch S9 or S8 and the seat will be automatically re-adjusted to the predetermined position.

It will also be observed that if the seat is in the "His" position for example, as may occur if an occupant gets out of the vehicle without moving the seat to its fully retracted position, it is possible to re-adjust the seat from the "His" position to the "Hers" position without requiring it to move through the fully retracted and lowered position.

Figure 12:
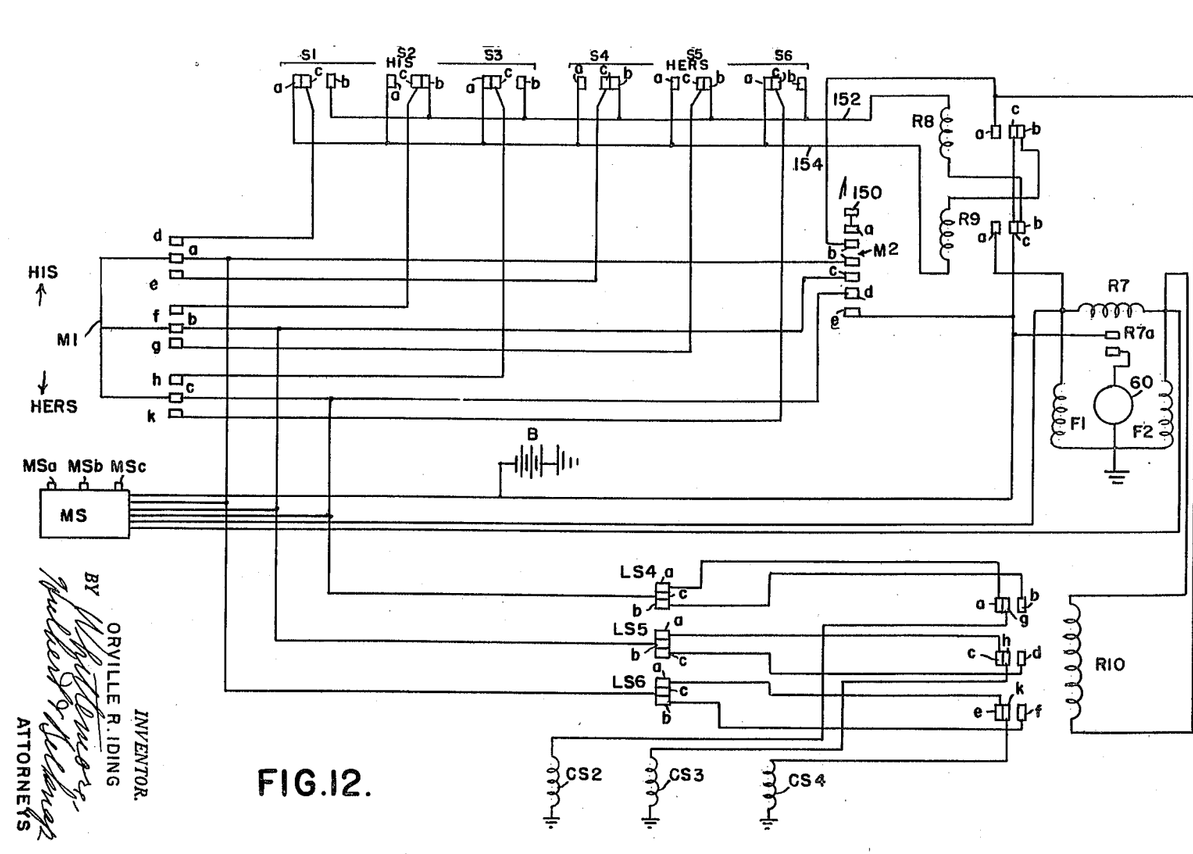
FIGURE 12 is a wiring diagram of a simplified improved circuit for the memory control system.

Referring now to FIGURE 12 there is shown a wiring diagram of a simplified and improved circuit including many of the parts of the circuit illustrated in FIGURE 11. Corresponding circuit elements in the two circuits bear the same reference characters.

As seen in FIGURE 12, the circuit includes a first set of "His" switches S1, S2 and S3, each of which includes a pair of spaced apart fixed contacts S1a, S1b, and S2a, S2b, and S3a, S3b. The switches also include intermediate movable contacts S1c, S2c, and S3c which are normally spaced from the fixed contacts.

The circuit also includes three "Hers" switches S4, S5 and S6 including spaced pairs of stationary contacts S4a, S4b, and S5a, S5b, and S6a, S6b. Intermediate the pairs of stationary contacts are movable contacts S4c, S5c and S6c. Again, movable contacts S4c, S5c and S6c are normally spaced from both of the stationary contacts.

A multiple pole, double throw switch M1 is provided, the movable switch member having movable contacts M1a, M1b and M1c, which are located in a normally open position spaced between the respective pairs of contacts M1d, M1e, and M1f, M1g, and M1h, M1k. The stationary contacts M1d, M1f, and M1h are "His" contacts connected respectively to the movable contacts S1c, S2c and S3c of the first set of "His" switches S1, S2 and S3. The contacts M1e, M1g and M1k are referred to as the "Hers" contacts and are connected respectively to the movable contacts S4c, S5c, and S6c of the second set of "Hers" switches S4, S5 and S6 respectively.

The circuit in addition includes a retracting switch M2 including a push button or other actuator 150 which when depressed is adapted to cause engagement between all of the contacts M2a, M2b, M2c, M2d and M2e.

The circuit includes the motor 60 having field windings F1 and F2 and a relay R7 controlling contact R7a which completes the circuit through the armature of the motor. The circuit also includes a motor directional control relay having windings R8 and R9. The winding R8 is connected by a line 152 to the contacts S1b, S2b, S3b, S4b, S5b and S6b. The motor directional control relay winding R9 is connected by a line 154 to the switch contacts S1a, S2a, S3a, S4a, S5a, and S6a. The winding or coil R8 has associated therewith stationary contacts R8a and R8b between which is positioned a movable contact R8c normally in engagement with contact R8b. The winding R9 has associated therewith a pair of stationary contacts R9a and R9b between which is positioned a movable contact R9c normally in engagement with stationary contact R9b. Contact R8a is connected through a retracting relay R10 to the field windings F2, a circuit being completed through the motor relay coil R8 and winding F1 to complete a circuit through the motor relay contact R7a to the armature of the motor. The contact R9a is connected directly to the field winding F1 and, through the high resistance coil of the relay R7 and the field winding F2 to ground.

The retracting relay R10 includes pairs of separated stationary contacts R10a, R10b, and R10c, R10d, and R10e, R10f. Intermediate the stationary contacts R10a and R10b is a movable contact R10g normally in engagement with stationary contact R10a. Intermediate the stationary contacts R10c and R10d is a movable contact R10h normally in engagement with stationary contact R10c. Intermediate stationary contacts R10e and R10f is a movable contact R10k which is normally in engagement with stationary contact R10e. Movable contact R10g is connected through the clutch actuator solenoid CS2 which is adapted to control movement of the lever 32 which effects vertical movement of the rear edge of the vehicle seat. Contact R10h is connected to clutch controlled solenoid CS3 which controls the lever 20 for effecting vertical movement of the front edge of the seat. Contact R10k is connected to clutch controlled solenoid CS4 which controls movement of the rack 48 which in turn effects horizontal movement of the seat. Limit switches LS4, LS5 and LS6 are provided. The limit switches each provide three normally closed contacts mounted on resilient arms as suggested in FIGURES 3 and 4. Limit switch LS4 includes the outer contacts LS4a and LS4b and the intermediate contact LS4c. Limit switch LS5 comprises the outer contacts LS5a and LS5b and the intermediate contact LS5c. Limit switch LS6 comprises the outer contacts LS6a and LS6b and intermediate contact LS6c.

The limit switches are associated with the housing 108 so that the projections 130 on the discs 86 move the intermediate contacts LS4c, LS5c and LS6c upwardly as the seat reaches the fully retracted position with regards to elevation of the front and rear edges and fore and aft position. Obviously, upward movement of these intermediate contacts breaks the contact between the intermediate contacts and the lower contacts LS4b, LS5b and LS6b, while maintaining contact with the upper contacts LS4a, LS5a and LS6a. Preferably, the discs 86 are provided with additional lateral projections similar to the projections 130, one such projection being indicated in dotted lines in FIGURE 3 at 156. The projections 156 are engageable with the projections of the intermediate contacts LS4c, LS5c and LS6c when the seat reaches a predetermined forward and upward limiting position. At this time downward movement of the intermediate contacts of the limit switches breaks the connection to the upper contacts LS4a, LS5a and LS6a respectively.

The intermediate contact LS4c is connected to contact M1c and also to contact M2d. Intermediate contact LS5c is connected to contact M1b and also to contact M2c. Intermediate contact LS6c is connected to contact M1a and also to contact M2b. Contacts LS4a, LS5a and LS6a are connected respectively to contacts R10a, R10c and R10e. Contacts LS4b, LS5b and LS6b are connected respectively to contacts R10b, R10d and R10f.

The memory control system is associated with the usual power adjusting system under the control of a manual switch MS which includes switch buttons MSa, MSb and MSc for effecting the required movement of the seat into a predetermined adjusted position.

While the operation of the system including the above described circuit may be determined from the foregoing, it is believed desirable to consider a typical operation of the system. In the following it is assumed that the seat is in the fully retracted position at which time all of the switches S1 through S6 are closed in one direction or another as indicated in the drawing. The limit switches LS4, LS5 and LS6 are thus assumed to be in the position in which the lower contacts LS4b, LS5b and LS6b are out of engagement with the intermediate contacts LS4c, LS5c and LS6c thereof. If now, the operator wishes to return the seat to the preselected "His" position, he actuates the switch M1 in an upward direction, thus completing a circuit between contacts M1a and M1d, between contacts M1b and M1f, and between contacts M1c and M1h. A circuit is thus completed from the battery B through contacts R9c, R9b, relay winding R8, contacts S2b, S2c, M1f, M1b, LS5c, LS5a, R10c, R10h, and solenoid CS3, to ground. An alternate circuit extends from contact R9b through contacts R8c, R8b, relay winding R9, and contacts S3a, S3c, M1h, M1c, LS4c, LS4a, R10a, R10g, through clutch solenoid CS2. However, as soon as either winding R8 or R9 is energized contact R8c or R9c is moved to the left as seen in the wiring diagram. Assume for example that the circuit constants are such that the relay R8 shifts the contact R8c before the relay R9 can shift the contact R9c. Thus, under these conditions the assumed circuit through the relay R9 is broken by movement of the contact R8c into engagement with the contact R8a and this in turn establishes a circuit through the retracting relay R10, thus shifting the R10 relay contacts, and through the field winding F2, the circuit also resulting in closure of the relay contact R7a as previously described. Under these conditions only the solenoids CS2, CS3 or CS4 which require closure to effect movement of the seat in the required direction are energized and energization of these solenoids is dependent upon which of the field windings F1 or F2 is energized. In other words, it is recognized that adjustment of the seat to a preselected position may require forward rotation of the motor in conjunction with actuation of one or two of the solenoids, followed by reverse motor actuation accompanied by actuation of the remaining clutch solenoids.

As soon as the last switch S1, S2 or S3 is closed, which calls for rotation of the motor 60 in the direction resulting from energization of field windings F2, the circuit through the initially energized one of the relays R8 or R9 is terminated. At this time however, closure of the remaining switches S1, S2 or S3 results in a circuit through the remaining winding R9 of the motor directional control relay which will in turn attract the contact R9c to the contact R9a and thus establishes a circuit through the field winding F1, thus reversing motor rotation. This direction of rotation does not result in energization of the retracting relay R10 and accordingly, the remaining adjustment or adjustments of the seat required to restore it to its preset position takes place, the operation continuing until the last one of the switches S1, S2 and S3 reaches open position. At this time the circuit through the relay coil R9 is broken and the motor and clutch actuating switches are de-energized.

The circuit of FIGURE 12 differs from that of FIGURE 11 primarily in its simplification with the omission of a number of relays, and also in the improved speed with which the seat is brought to retracted or a preselected operating position. This is for the reason that two or more adjustments of the seat may take place simultaneously. Inasmuch as the retracted position of the seat represents a limiting position as to all three aspects of adjustment; namely, horizontal movement, vertical movement of the front edge of the seat, and vertical movement of the rear edge of the seat, it will be apparent that the restoring movement of the seat may be such as to require rotation of the motor in a single direction while all three of the solenoid actuating clutches are initially engaged. Thus, all three seat adjustments take place simultaneously, each terminating as a result of dropping out of the appropriate clutch control solenoid when the particular adjustment is complete.

The drawings and the foregoing specification constitute a description of the improved electrical circuit for a memory seat control system in such full, clear, concise and exact terms as to enable any person skilled in the art to practice the invention, the scope of which is indicated by the appended claims.

What I claim as my invention is:

1. A memory control system for a horizontally and vertically adjustable vehicle seat including control mechanism and an electric motor for adjusting said seat, comprising a first set of mechanism control switches operatively associated with said control mechanism as to be closed thereby except when said seat is in a first preset position, a second set of mechanism control switches operatively associated with said control mechanism to be closed thereby except when said seat is in a second preset position, a plurality of limit switches operatively associated with said control mechanism to be closed thereby except when said seat is in a fully rearward and down retracted position, a first mechanism control circuit including said first set of mechanism control switches and a single manual switch operable to energize said circuit to move said seat horizontally and vertically directly to said first preset position from any intermediate position thereof, a second mechanism control circuit including said second set of mechanism control switches, and a single manual switch operable to energize said second circuit to move said seat horizontally and vertically directly to said second preset position from any intermediate position thereof, and a third mechanism control circuit including said limit switches and a single manual switch operable to energize said third circuit to move said seat down and rearward to fully retracted position.

2. In a memory control system for moving an article horizontally and vertically between a limiting position and a variably adjustable intermediate position including a reversible electric motor and also including a plurality of selectively energizable solenoid clutches connecting the motor to different article adjustment means, the structure comprising a first set of switches operatively associated with said article and arranged to be closed except when said article is in a limiting position, a second set of switches operatively associated with said article and arranged to be closed except when said article is in a selected intermediate position, a first single manually operable switch connected to said motor and solenoid clutches through said first set of switches and operable to energize said clutches and motor to move said article rearward and down to its limiting position, and a second single manually operable switch connected to said motor and solenoid clutches through said second set of switches and operable to energize said clutches and motor to move said article horizontally and vertically directly to the selected intermediate position from any intermediate position thereof.

3. In a memory control system for moving an article horizontally and vertically between a limiting position and a variably adjustable intermediate position including a reversible electric motor and also including a plurality of selectively energizable solenoid clutches connecting the motor to different article adjustment means, the structure comprising a first set of two-position switches operatively associated with said article and arranged to be closed except when said article is in a limiting position, a second set of switches operatively associated with said article and arranged to be closed except when said article is in a selected intermediate position, a first single manually operable switch connected to said motor and solenoid clutches through said first set of switches and operable to energize the motor in the direction indicated by the direction of closure of switches of said second set and to energize selected ones of said solenoid clutches as determined by the direction of closure of switches of said first set to move said article rearward and down to its limiting position, and a second single manually operable switch connected to said motor and solenoid clutches through said second set of switches and operable to energize said clutches and motor to move said article horizontally and vertically to the selected intermediate position, said system including motor reversing means operable upon completion of all adjustments of said article requiring motor rotation in one direction if switches of said second set requiring reverse rotation of said motor remain closed.

4. In a memory control system for positioning an adjustable article horizontally and vertically which is operative to produce selective movement of said article from any intermediate position thereof to a limiting position and a pair of variable preselected intermediate positions, including a reversible electric motor and a plurality of separate means for adjusting said article and also including a plurality of selectively energizable solenoid operated clutches for connecting the motor to different ones of said article adjusting means, a solenoid associated with each solenoid operated clutch and a source of electrical energy: a control circuit comprising a manually actuable retracting switch connected in series between said source of electrical energy and said motor and solenoids and having a plurality of contacts adapted to be connected in a single series circuit with said motor and said source of electrical energy on actuation of said switch, means operatively associated with said retracting switch operable on actuation of said retracting switch for connecting said source of electrical energy to said solenoids and said motor for energization thereof in a manner to cause said article adjusting means to move said article rearward and down to a fully retracted position, including a series connection between said source of electrical energy and said motor to energize said motor for rotation in a predetermined direction and means connecting said solenoids to said source of electrical energy in parallel with each other and with said motor, a second manually actuable switch connected in series between said source of electrical energy and said solenoids, and means operatively associated with said second switch operable on actuation of said second switch to connect said source of electrical energy to said solenoids and said motor for energizing said motor and solenoids to cause said article adjusting means to move said article horizontally and vertically directly to one of said preselected intermediate positions from any intermediate position thereof.

5. In a memory control system for positioning an adjustable article which is operative to produce selective movement of said article from any intermediate position thereof to a limiting position and a pair of variable preselected intermediate positions, including a reversible electric motor and a plurality of separate means for adjusting said article and also including a plurality of selectively energizable solenoid operated clutches for connecting the motor to different ones of said article adjusting means, a solenoid associated with each solenoid operated clutch and a source of electrical energy: a control circuit comprising a manually actuable retracting switch connected in series between said source of electrical energy and said motor and solenoids, means operatively associated with said retracting switch operable on actuation of said retracting switch for connecting said source of electrical energy to said solenoids and said motor for energization thereof in a manner to cause said article adjusting means to move said article to a fully lowered and retracted position, a second manually actuable switch connected in series between said source of electrical energy and said solenoids, and means operatively associated with said second switch operable on actuation of said second switch to connect said source of electrical energy to said solenoids and said motor for energizing said motor and solenoids to cause asid article adjusting means to move said article to one of said preselected intermediate positions, said last mentioned means including a relay and an automatically actuated switch connected in series between said motor and said source of electrical energy operative to connect said motor to said source of electrical energy for initial rotation in one of two opposite directions, to complete an electrical connection between certain of said solenoids and said source of electrical energy depending on the direction of rotation of said motor and the position of said article with respect to the desired position thereof, and to subsequently connect said motor to said source of electrical energy for rotation in the other of said two opposite directions and to complete an electrical connection between the remainder of said solenoids and said source of electrical energy in accordance with the position of said article at the end of the rotation of said motor in said one direction.

6. In a memory control system for positioning an adjustable article horizontally and vertically which is operative to produce selective movement of said article from any intermediate position thereof to variable preselected intermediate positions, including a reversable electric motor and a plurality of separate means for adjusting said article in different directions horizontally and vertically and also including a plurality of selectively energizable solenoid operated clutches for connecting the motor to different ones of the article adjusting means, a solenoid associated with each solenoid operated clutch and a source of electrical energy: a control circuit comprising a manually actuable switch connected in series between said source of electrical energy and said solenoids, and means operatively associated with said switch operable on actuation of said switch to connect the source of electrical energy to the solenoids and the motor for energizing the motor and solenoids to cause the article adjusting means to adjust the article in a plurality of different directions horizontally and vertically simultaneously to move said article directly to a preselected intermediate position from any intermediate position thereof.

7. A memory control system as set forth in claim 6 and further including means responsive to completion of adjustment of said article in one of said different directions to disconnect the source of electrical energy from the solenoid of the solenoid operated clutch connecting the adjusting means for moving the object in said one direction to said motor without disconnecting said motor.

8. A memory control system as set forth in claim 6 and further including means responsive to completion of adjustment of said article for disconnecting the source of electrical energy from the remaining connected solenoids and said motor.

9. In a memory control system for positioning a horizontally and vertically adjustable seat, a control circuit for said seat comprising a switch, and means operatively associated with said switch and the seat operable on actuation of said switch for horizontally and vertically adjusting said seat directly to a preselected intermediate position from any other intermediate position thereof.

10. In a memory control system for positioning an adjustable article horizontally and vertically which is operative to produce selective movement of said article from any intermeidate position thereof directly to variable preselected intermediate positions, including motor means, a plurality of separate means for adjusting said article in different directions on connection of said separate means to said motor means, and engaging means for individually connecting said separate means to said motor means: a control circuit for said seat comprising a manually actuable switch, and means associated with the switch, motor means, engaging means and article adjusting means operable on actuation of said switch for operating the engaging means to sequentially connect each of said actuating means to said motor means and for sequentially energizing said motor means to move said article horizontally and vertically directly to a preselected intermediate position from any intermediate position.

References Cited in the file of this patent

UNITED STATES PATENTS

| | | |
|---|---|---|
| 2,720,619 | James | Oct. 11, 1955 |
| 2,805,702 | Appleton | Sept. 10, 1957 |
| 2,823,949 | Williams et al. | Feb. 18, 1958 |
| 2,827,105 | Brundage | Mar. 18, 1958 |
| 2,829,002 | Leavingood et al. | Apr. 1, 1958 |
| 2,886,094 | Pickles | May 12, 1959 |